US011099870B1

(12) United States Patent
Brooker et al.

(10) Patent No.: US 11,099,870 B1
(45) Date of Patent: Aug. 24, 2021

(54) REDUCING EXECUTION TIMES IN AN ON-DEMAND NETWORK CODE EXECUTION SYSTEM USING SAVED MACHINE STATES

(71) Applicant: Amazon Technologies, Inc., Seattle, WA (US)

(72) Inventors: Marc John Brooker, Seattle, WA (US); Mikhail Danilov, Sammamish, WA (US); Douglas Stewart Laurence, Mercer Island, WA (US); Anthony Nicholas Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 16/045,593

(22) Filed: Jul. 25, 2018

(51) Int. Cl.
  *G06F 9/455* (2018.01)
  *G06F 11/14* (2006.01)

(52) U.S. Cl.
  CPC ...... *G06F 9/45558* (2013.01); *G06F 11/1451* (2013.01); *G06F 2009/45562* (2013.01); *G06F 2009/45575* (2013.01); *G06F 2201/84* (2013.01)

(58) Field of Classification Search
  CPC .................................................. G06F 9/45533
  USPC ............................................................ 718/1
  See application file for complete search history.

(56) References Cited

U.S. PATENT DOCUMENTS

| 4,949,254 | A  | 8/1990  | Shorter          |
| 5,283,888 | A  | 2/1994  | Dao et al.       |
| 5,970,488 | A  | 10/1999 | Crowe et al.     |
| 6,260,058 | B1 | 7/2001  | Hoenninger et al.|

(Continued)

FOREIGN PATENT DOCUMENTS

| EP | 2663052 A1   | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Mehran Kamran
(74) *Attorney, Agent, or Firm* — Knobbe, Martens, Olson & Bear, LLP

(57) ABSTRACT

Systems and methods are described for reducing latency to service requests to execute code on an on-demand code execution system by maintaining snapshots of virtual machine instances in a ready state to execute such code. A user may submit code to the on-demand code execution system, which code depends on other software, such as an operating system or runtime. The on-demand code execution system can generate a virtual machine instance provisioned with the other software, and initialize the instance into a state at which it is ready to execute the code. The on-demand code execution system can then generate a snapshot of the state of the instance, and halt the instance. When a request to execute the code is received, the snapshot can be used to quickly restore the instance. The code can then be executed (Continued)

within the instance, reducing the need to initialize the instance or maintain the instance in an executing state.

19 Claims, 5 Drawing Sheets

(56) References Cited

U.S. PATENT DOCUMENTS

| | | |
|---|---|---|
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | McGrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,966,495 B2 | 2/2015 | Kulkarni |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |

(56) References Cited

U.S. PATENT DOCUMENTS

| | | |
|---|---|---|
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1* | 12/2018 | Chai .................. G06F 16/2365 |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,365,985 B2 | 7/2019 | Wagner |
| 10,387,177 B2 | 8/2019 | Wagner et al. |
| 10,402,231 B2 | 9/2019 | Marriner et al. |
| 10,437,629 B2 | 10/2019 | Wagner et al. |
| 10,445,140 B1 | 10/2019 | Sagar et al. |
| 10,503,626 B2 | 12/2019 | Idicula et al. |
| 10,528,390 B2 | 1/2020 | Brooker et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,623,476 B2 | 4/2020 | Thompson |
| 10,649,749 B1 | 5/2020 | Brooker et al. |
| 10,691,498 B2 | 6/2020 | Wagner |
| 10,713,080 B1 | 7/2020 | Brooker et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,171 B2 | 9/2020 | Wagner et al. |
| 10,817,331 B2 | 10/2020 | Mullen et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1* | 11/2009 | Astete ................ G06F 9/45533<br>718/1 |
| 2009/0300151 A1* | 12/2009 | Friedman ............ G06F 11/3664<br>709/222 |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |

(56) References Cited

U.S. PATENT DOCUMENTS

| | | |
|---|---|---|
| 2010/0257116 A1 | 10/2010 | Mehta et al. |
| 2010/0257269 A1 | 10/2010 | Clark |
| 2010/0269109 A1 | 10/2010 | Cartales |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2011/0010690 A1 | 1/2011 | Howard et al. |
| 2011/0010722 A1 | 1/2011 | Matsuyama |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1* | 6/2011 | Smith ............ H04L 43/0852 370/252 |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265067 A1 | 10/2011 | Schulte et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1* | 11/2011 | Wu ............... H04L 67/1097 718/1 |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0072920 A1* | 3/2012 | Kawamura ......... G06F 9/30123 718/108 |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0204164 A1 | 8/2012 | Castanos et al. |
| 2012/0222038 A1 | 8/2012 | Katragadda et al. |
| 2012/0233464 A1 | 9/2012 | Miller et al. |
| 2012/0324236 A1* | 12/2012 | Srivastava ......... H04L 63/0876 713/189 |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0151587 A1 | 6/2013 | Takeshima et al. |
| 2013/0151648 A1 | 6/2013 | Luna |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Wnterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0274006 A1* | 10/2013 | Hudlow ............ G07F 17/3223 463/29 |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1* | 11/2013 | McGrath ............ G06F 9/455 726/1 |
| 2013/0311650 A1 | 11/2013 | Brandwine et al. |
| 2013/0326506 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |

(56) References Cited

U.S. PATENT DOCUMENTS

| | | |
|---|---|---|
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1* | 3/2015 | Kothari ............... H04L 49/70 718/1 |
| 2015/0074662 A1 | 3/2015 | Saladi et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1* | 5/2015 | Zou .................. G06F 11/1464 707/649 |
| 2015/0142952 A1 | 5/2015 | Bragstad et al. |
| 2015/0143381 A1 | 5/2015 | Chin et al. |
| 2015/0163231 A1 | 6/2015 | Sobko et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1* | 8/2015 | Keith .................. G06F 21/53 726/4 |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0269494 A1 | 9/2015 | Kardes et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1* | 1/2016 | Chandrasekaran ........................ G06F 9/45558 718/1 |
| 2016/0019082 A1* | 1/2016 | Chandrasekaran ... G06F 16/128 718/1 |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092252 A1* | 3/2016 | Wagner ............... G06F 9/45533 718/1 |
| 2016/0092320 A1 | 3/2016 | Baca |
| 2016/0092493 A1 | 3/2016 | Ko et al. |
| 2016/0098413 A1 | 4/2016 | Davis et al. |
| 2016/0100036 A1 | 4/2016 | Lo et al. |
| 2016/0103739 A1* | 4/2016 | Huang ................ G06F 11/1451 714/19 |
| 2016/0117163 A1* | 4/2016 | Fukui ....................... G06F 8/65 717/171 |
| 2016/0117254 A1 | 4/2016 | Susarla et al. |
| 2016/0124665 A1 | 5/2016 | Jain et al. |
| 2016/0124978 A1* | 5/2016 | Nithrakashyap ........ H04L 67/10 707/639 |
| 2016/0140180 A1 | 5/2016 | Park et al. |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0134519 A1* | 5/2017 | Chen ....................... H04L 67/10 |
| 2017/0230262 A1 | 8/2017 | Sreeramoju et al. |
| 2017/0230499 A1 | 8/2017 | Mumick et al. |
| 2017/0249130 A1* | 8/2017 | Smiljanic ................. G06F 8/43 |
| 2017/0272462 A1 | 9/2017 | Kraemer et al. |
| 2017/0286143 A1 | 10/2017 | Wagner et al. |
| 2017/0286187 A1 | 10/2017 | Chen et al. |

(56) References Cited

U.S. PATENT DOCUMENTS

| | | |
|---|---|---|
| 2017/0329578 A1 | 11/2017 | Iscen |
| 2017/0346808 A1 | 11/2017 | Anzai et al. |
| 2017/0371703 A1* | 12/2017 | Wagner .................. G06F 9/485 |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1* | 1/2018 | Ramanathan ....... G06F 9/45558 |
| 2018/0046453 A1 | 2/2018 | Nair et al. |
| 2018/0046482 A1 | 2/2018 | Karve et al. |
| 2018/0060221 A1 | 3/2018 | Yim et al. |
| 2018/0067841 A1 | 3/2018 | Mahimkar |
| 2018/0081717 A1 | 3/2018 | Li |
| 2018/0095738 A1 | 4/2018 | Dürkop et al. |
| 2018/0121245 A1 | 5/2018 | Wagner et al. |
| 2018/0143865 A1 | 5/2018 | Wagner et al. |
| 2018/0150339 A1 | 5/2018 | Pan et al. |
| 2018/0192101 A1 | 7/2018 | Bilobrov |
| 2018/0239636 A1 | 8/2018 | Arora et al. |
| 2018/0253333 A1 | 9/2018 | Gupta |
| 2018/0275987 A1 | 9/2018 | Vandeputte |
| 2018/0285101 A1 | 10/2018 | Yahav et al. |
| 2018/0341504 A1 | 11/2018 | Kissell |
| 2019/0072529 A1 | 3/2019 | Andrawes et al. |
| 2019/0073234 A1* | 3/2019 | Wagner .................. G06F 9/50 |
| 2019/0102231 A1 | 4/2019 | Wagner |
| 2019/0108058 A1 | 4/2019 | Wagner et al. |
| 2019/0140831 A1* | 5/2019 | De Lima Junior ... H04L 9/3226 |
| 2019/0155629 A1 | 5/2019 | Wagner et al. |
| 2019/0171470 A1 | 6/2019 | Wagner |
| 2019/0179725 A1 | 6/2019 | Mital et al. |
| 2019/0180036 A1 | 6/2019 | Shukla |
| 2019/0196884 A1 | 6/2019 | Wagner |
| 2019/0227849 A1 | 7/2019 | Wisniewski et al. |
| 2019/0235848 A1 | 8/2019 | Swiecki et al. |
| 2019/0250937 A1 | 8/2019 | Thomas et al. |
| 2019/0286475 A1 | 9/2019 | Mani |
| 2019/0303117 A1 | 10/2019 | Kocberber et al. |
| 2019/0361802 A1 | 11/2019 | Li et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0026527 A1* | 1/2020 | Xue .................... G06F 9/44505 |
| 2020/0057680 A1 | 2/2020 | Marriner et al. |
| 2020/0104198 A1 | 4/2020 | Hussels et al. |
| 2020/0104378 A1 | 4/2020 | Wagner et al. |
| 2020/0110691 A1 | 4/2020 | Bryant et al. |
| 2020/0142724 A1 | 5/2020 | Wagner et al. |
| 2020/0192707 A1 | 6/2020 | Brooker et al. |

FOREIGN PATENT DOCUMENTS

| | | |
|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/098445 A1 | 5/2018 |
| WO | WO 2020/005764 A1 | 1/2020 |
| WO | WO 2020/069104 A1 | 4/2020 |

OTHER PUBLICATIONS

Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Retrieved from the Internet, Jun. 26, 2016, URL: http://docs.aws.amazon.com/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Bhadani et al., Performance evaluation of web servers using central load balancing policy over virtual machines on cloud, Jan. 2010, 4 pages.
CodeChef ADMIN discussion web page, retrieved from https://discuss.codechef.com/t/what-are-the-memory-limit-and-stack-size-on-codechef/14159, 2019.
CodeChef IDE web page, Code, Compile & Run, retrieved from https://www.codechef.com/ide, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.

(56) References Cited

OTHER PUBLICATIONS

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Ha et al., A Concurrent Trace-based Just-In-Time Compiler for Single-threaded JavaScript, utexas.edu (Year: 2009).
Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).
Lagar-Cavilla, H. Andres, et al. "Snowflock: Virtual machine cloning as a first-class cloud primitive." ACM Transactions on Computer Systems (TOCS) Jan. 29, 2011: 1-45. (Year: 2011).
Wood, Timothy, et al. "Cloud Net: dynamic pooling of cloud resources by live WAN migration of virtual machines." ACM Sigplan Notices 46.7 (2011): 121-132. (Year: 2011).
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Office Action in Canadian Application No. 2,962,633 dated May 21, 2020.
Office Action in Canadian Application No. 2,962,631 dated May 19, 2020.

(56) References Cited

OTHER PUBLICATIONS

International Search Report for Application No. PCT/US2019/038520 dated Aug. 14, 2019.

* cited by examiner

US 11,099,870 B1

REDUCING EXECUTION TIMES IN AN ON-DEMAND NETWORK CODE EXECUTION SYSTEM USING SAVED MACHINE STATES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
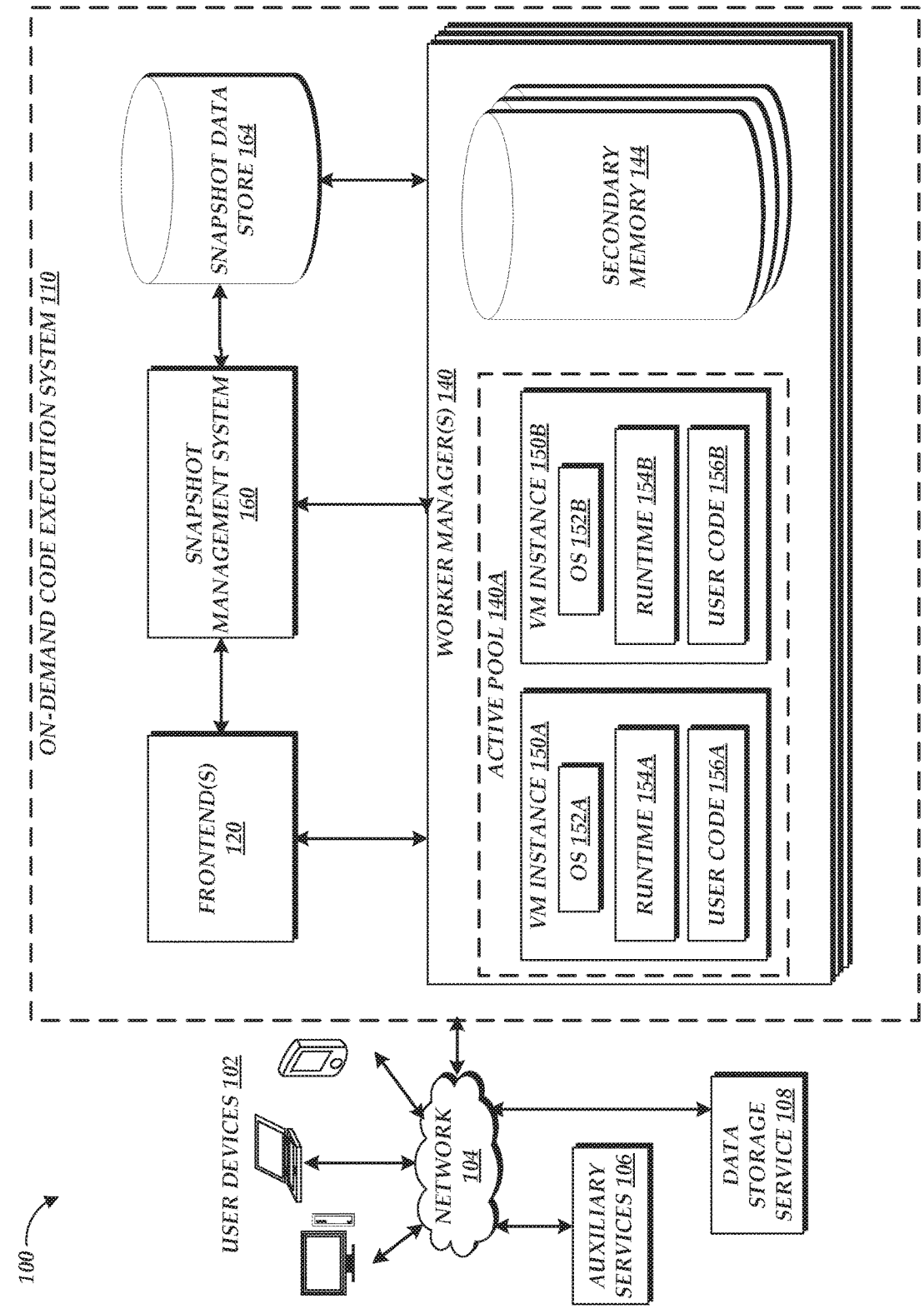
FIG. 1 is a block diagram depicting an illustrative environment in which an on-demand code execution system can operate to execute tasks corresponding to code, which may be submitted by users of the on-demand code execution system, and to reduce times for executing code by generating snapshots of virtual machine instances initialized to execute the code.

Generally described, aspects of the present disclosure relate to an on-demand code execution system enabling rapid execution of code, which may be supplied by users of the on-demand code execution system. An on-demand code execution system may also be known as a "serverless" execution system or a request-drive code execution system. More specifically, embodiments of the present disclosure relate to reducing the latency (or "cold start" time) for execution of code, by utilizing snapshots or other system images to save a state of a virtual machine instance at a point in time when the instance is initialized to execute code.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

To maintain security on behalf of users, tasks executions are generally partitioned on the on-demand code execution system, such that code executing on behalf of one user executes independently of (and cannot without authorization access the data of) code executing on behalf of another user. One known mechanism for partitioning software executions is the use of virtual machine instances, which provide an operating-system level "barrier" between executions. Because each virtual machine instance is implemented as a separate machine, very high levels of security can be provided between code executions. However, virtual machine instances also impose overhead for task executions in terms of both time and computing resources used to execute tasks. Specifically, because virtual machine instances can represent an entire machine state (in a manner similar to a machine running on "bare metal" hardware), the virtual machine instance must generally be booted into its operating system and placed into an initialized state prior to executing code. This startup time can require seconds of time, significantly increasing the latency of the on-demand code execution system in executing code (e.g., as compared to a desired execution time of 50-100 milliseconds or less).

The on-demand code execution system may implement a variety of technologies to reduce this latency. Illustratively, the on-demand code execution system may be configured to maintain within a number virtual machine instances in an executing state, into which code of a task may be provisioned and executed. Because these execution environments are maintained as executing on the on-demand code execution system, the execution of a task may require little more than provisioning the execution environment with code and executing that code. While maintaining a virtual machine in an executing state can facilitate more rapid execution of a task, it also utilizes some amount of working computing resources of a host computing device, such as central processing unit (CPU) cycles and registers, random access memory (RAM), and the like. Moreover, different tasks may require different configurations of a virtual machine instance in order to execute code of the task, such as different operating systems, runtime environments, dependency objects, and the like. Thus, it may not be possible or practical of the on-demand code execution system to maintain executing virtual machine instances suitable for all tasks. In contrast, maintaining virtual machine instances in a completely halted state (e.g., shut down), can utilize fewer or no working resources, and can instead utilize non-working resources (e.g., resources not required for currently executing processes) such as long term memory storage provided by a hard disk drive (HDD). However, maintaining an environment in a non-executing state may require that the environment first be initialized prior to executing a task within the environment, thus potentially delaying execution of the task. The time to initialize the virtual machine from a shut down to initialized state is sometimes referred to as "cold start" time. Cold start times for virtual machine instances generally increase the latency required on the on-demand code execution system to execute code in response to a user request for that execution.

To address this trade-off, embodiments of the on-demand code execution system can be configured to reduce the latency to execute tasks by maintaining virtual machine instances for a task in an initialized but non-executing state. Specifically, the on-demand code execution system can be configured, on submission of a task, to generate a virtual machine instance for the task, and to initialize that virtual machine instance into a state at which the instance is prepared to execute the task. Initialization can include, for example, booting an operating system of the instance (e.g., a LINUX™ or MICROSOFT WINDOWS™ operating systems), provisioning the operating system with a runtime for code, initializing the runtime (e.g., by starting a JAVA™ virtual machine within the operating system), provisioning the instance with code of a task, etc. In some instances, initialization can further include executing a portion of the code designated within the code as an initialization portion. For example, code of a task may when executed, implement the initialization portion to prepare for receiving arguments to process via execution of the code. The on-demand code execution system may therefore initialize a virtual machine instance for the code by implementing the initialization portion of the code, such that the code is in a state at which it is prepared to receive arguments. To reduce load on computing resources of the on-demand code execution system, the system may then save a machine state of the virtual machine instance, such as by creating a snapshot of the virtual machine instance at a point in time that it is initialized. Thereafter, when a request to execute the task (e.g., to process arguments) is received, the on-demand code execution system can start the virtual machine instance using the snapshot, in order to quickly bring the instance into an initialized state. The task can then be executed within the instance at a low latency. One potential concern with the above-noted techniques is that of the data required to maintain the variety of snapshots on the on-demand code execution system. For example, it may be most beneficial on the system to maintain, for each task on the system, a corresponding snapshot of a virtual machine instance initialized to execute the task. However, a significant amount of data may be required to independently represent the state of a virtual machine instance initialized to execute each distinct task. It may thus be infeasible to maintain snapshots for each task on the on-demand code execution system on a host device with computational capacity to execute a corresponding virtual machine. While these snapshots could potentially be stored in a centralized storage system, such as network attached storage (NAS), transmission of a snapshot from such a storage system to a host device would again add latency to the time required by the on-demand code execution system.

To address this concern, the on-demand code execution system may be configured, in accordance with embodiments of the present disclosure, to store states of initialized virtual machine instances as cascading snapshots, with multiple different and later machine states represented at least partly by reference to a prior machine state shared by each later state. Illustratively, consider an instance in which two different tasks on the on-demand code execution system, each corresponding to different user-submitted code, depend on common software to execute the respective code. For example, both sets of user-submitted code may be written in the PYTHON™ programming language, and the on-demand code execution system may support execution of Python code via a Python runtime executed within a Linux operating system. As such, while the states of two virtual machine instances initialized to execute the different sets of code may be different, a significant overlap would also exist between those states (e.g., with respect to the Linux operating system and the Python runtime, perhaps). To reduce the amount of data needed to store the machine states, the on-demand code execution system may generate incremental state information for a virtual machine instance in various different states, enabling the different states of instances initialized for various tasks to be described with reference to a prior common state. Illustratively, in the instance described above (where different user-submitted code depends on a common runtime and operating system), the on-demand code execution system may generate a virtual machine instance, boot the operating system on the instance and initialize the runtime, and then generate a "core" snapshot the virtual machine instance. The on-demand code execution system may then initialize the first user-submitted code on the instance, and generate a "first task" snapshot, which represents a state of the virtual machine instance initialized to execute the first user-submitted code as a difference in the state of the virtual machine instance from the state reflected in the first snapshot. Specifically, because the first task snapshot reflects the initialized state of the virtual machine as a difference from the core snapshot, the amount of information within the first task snapshot itself can be expected to be relatively small (e.g., on the order of a size of the first user-submitted code). Thereafter, the on-demand code execution system can return the virtual machine instance to the state reflected in the core snapshot, and initialize the instance the second user-submitted code on the instance. The on-demand code execution system may then generate a "second task" snapshot representing a state of the virtual machine instance initialized to execute the second user-submitted code as a difference in the state of the virtual machine instance from the state reflected in the core snapshot. A similar process may be repeated for each additional task that relies on the runtime and operating system initialized in the core snapshot. Because a majority of machine state information is captured in the core snapshot, the size of each task snapshot can be relatively small. For this reason, it is feasible to configure a host device to store state information for a wide variety of virtual machine instances, each initialized to execute different tasks on the on-demand code execution system, by storing a "core" snapshot and task-specific snapshot for each different task.

In some embodiments, the concept of differential snapshots may be expanded to reflect multiple layers of virtual machine states. For example, a first "OS" snapshot may be created for a virtual machine instance initialized with a given operating system, and multiple "runtime" snapshots may be created with various runtimes initialized on that operating system. Each runtime snapshot may be used to generate task-specific snapshots for tasks intended to execute based on that runtime. Such a configuration can enable a single host device to support a wide variety of machine states, reflecting virtual machine instances each initialized to execute a different task, even when such tasks depend on various combinations of operating systems, runtimes, or other software. Moreover, because the amount of information in a task-specific snapshot may be relatively small, such snapshots can be quickly and easily transferred between devices. For example, each host device within an on-demand code execution system may be provisioned with one or more core snapshots (or potentially combinations of OS and runtime snapshots) and maintain a set of task-specific snapshots for tasks expected to be executed on that host in the near future. Should a reconfiguration of host devices become necessary, or should a host be instructed to execute a task for which it does not current hold a task-specific snapshot, a task-specific snapshot can be retrieved by the host over a network in a time similar to retrieving the code of the task itself. Thus, host devices within the on-demand code execution system can be enabled to rapidly execute code via a reduction in cold start time for virtual machine instances, without significantly increasing latency for "exception" cases in which task information must be provisioned onto the machine at the time of a request to execute the task.

In some instances, a task may be utilized by more than one user. For example, a first user may author a task and make the task available to be executed by a variety of different users. To ensure security of user data, the on-demand code execution system can be configured to ensure that executions of the same task between different users are provided with isolated execution environments. For example, a first user may execute a given task in a first virtual machine instance, a second user may execute the same task in a second virtual machine instance, etc. One advantage of the task-specific virtual machine instance snapshots described herein is the ability to quickly generate, from a common task-specific snapshot, a variety of different user-specific environments. In particular, as requests to execute a task are received from various users, a single task-specific snapshot may be used as a basis to generate different virtual machine instances for each user. In this manner, the time required to initialize a virtual machine instances to execute a task can be "amortized" across multiple requests.

In some instances, the state of a user-specific virtual machine instance (e.g., for a given task) may be maintained as a user-specific snapshot of that instance. Thereafter, if subsequent requests to execute a task are received from a user, the user-specific snapshot may be used to restore the user-specific virtual machine instance. In one embodiment, the time required to restore a user-specific virtual machine instance may be reduced, by maintaining an "ancestor" virtual machine instance in a primary memory (e.g., RAM) of a host device, which ancestor instance formed a basis for multiple later instances. For example, an ancestor instance may correspond to a task-specific snapshot, from which multiple user-specific instances (and corresponding snapshots) were created. As such, a host may maintain one or more copies of an ancestor instance in primary memory, and when a user request to execute a task is received, the host may modify the ancestor instance to match the user's specific instance. The modification may, for example, be based on the user-specific snapshot for the user, which reflects a "delta" in machine state between the ancestor instance state recorded in the task-specific snapshot and the user-specific instance. Because this delta may be fairly small (e.g., reflecting a change in processor registers and some "working set" of primary memory), modification of the ancestor instance can be completed very quickly. Thereafter, the instance (which after modification represents the user-specific instance) can be started in order to facilitate execution of the task within the user-specific instance. In some embodiments, multiple copies of an ancestor instance may be maintained in a primary memory on a host (e.g., in a non-executing state), any of which may be modified to represent an environment associated with a user. Thus, as user requests to execute a task are received, ancestor instances may be rapidly allocated to those users to facilitate execution of the task.

The general execution of tasks on the on-demand code execution system will now be discussed. As described in detail herein, the on-demand code execution system may provide a network-accessible service enabling users to submit or designate computer-executable source code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

Because the number of different virtual machine instances that a host computing device may execute is limited by the computing resources of that host (and particularly by highly utilized resources such as CPU cycles and RAM), the number of virtual machine instances in a pool on the on-demand code execution system is similarly limited. Thus, in accordance with the embodiments of the present disclosure, the on-demand code execution system may generate initialized execution environments for a large number of tasks (e.g., more environments than could be maintained as executing on the on-demand code execution system at a given point in time), and maintain those environments in a non-running state, by saving state information of those environments. When a request to execute a task on the system is received, the system can utilize the state information to rapidly generate an environment pre-initialized to support execution of the task. Thereafter, the state environment of the environment can once again be saved, and the environment can be placed into a non-executing state. In this manner, environments for any number of tasks may be held in a pre-initialized state and used to enable rapid generation of task code, without requiring the on-demand code execution system to maintain such environments in an executing state.

For illustrative purposes, embodiments of the present disclosure are described with reference to a specific type of execution environment: a virtual machine instance. As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance. Thus, examples made with reference to virtual machine instances, unless otherwise specified, may be modified to utilize other types of execution environments.

Moreover, embodiments of the present disclosure are described with reference to snapshots as an example of a system image, which stores the state of an execution environment at a given point in time. Snapshotting of virtual machines is a known technique, and thus will not be described in detail herein. However, in brief, snapshotting may generate a data file which stores a state of a virtual machine instance at a point in time, including state elements such as a content of CPU registers of the virtual machine instance, contents of RAM of the virtual machine instances, states of pages within RAM (e.g., as "dirty" or "clean"), and any other information required to return the virtual machine instances to its prior state at a later point in time. While snapshots are described herein as one example of a system image that stores state information, other system images are also known in the art. For example, a checkpoint data file may be utilized to store the state of a software container execution environment. Thus, examples made with reference to snapshots, unless otherwise specified, may be modified to utilize other types of system images.

As will be appreciated by one of skill in the art in light of the present disclosure, the embodiments disclosed herein improves the ability of computing systems, such as on-demand code execution systems, to execute code in an efficient manner. Specifically, embodiments of the present disclosure increase the efficiency of computing resource usage of such systems by enabling execution of tasks within already initialized execution environments, and also enabling storage of state information for such environments while minimizing memory required to store that information. Moreover, the presently disclosed embodiments address technical problems inherent within computing systems; specifically, the limited nature of computing resources with which to execute code and the inefficiencies caused by maintaining unutilized environments in an executing state. These technical problems are addressed by the various technical solutions described herein, including the execution of tasks within execution environments for pre-initialized for such tasks, and the storage of those environments as cascading state information. Thus, the present disclosure represents an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the on-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc.) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task (which may also be referred to as a request to execute the task) may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. Calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. For example, calls may be distributed to load balance between frontend 120. Other distribution techniques, such as anycast routing, will be apparent to those of skill in the art.

The on-demand code execution system further includes one or more worker managers 140 that manage the execution environments, such as virtual machine instances 150 (shown as VM instance 150A and 150B, generally referred to as a "VM"), used for servicing incoming calls to execute tasks, and that manage the memory states of execution environments. While the following will be described with reference to virtual machine instances 150 as examples of such environments, embodiments of the present disclosure may utilize other environments, such as software containers. In the example illustrated in FIG. 1, each worker manager 140 manages an active pool 140A, which is a group (some-times referred to as a pool) of virtual machine instances 150 executing on one or more physical host computing devices that are initialized to execute a given task (e.g., by having the code of the task and any dependency data objects loaded into the instance). The active pool 140 illustratively is implemented using primary memory (e.g., RAM) of host devices implementing or under control of the worker manager 140.

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. As another example, the tasks of the group may share common dependencies, such that an environment used to execute one task of the group can be rapidly modified to support execution of another task within the group.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. In some instances, each VM 150 may be associated with additional information, such as state information, maintained across individual executions of a task. For example, when initially created, a VM 150 may initialize the OS 152, and each time the user code 156 is executed in the VM 150, a state of the VM 150 may change. State of a VM 150 may be maintained, for example, within registers of a virtual CPU of the VM 150, within RAM of the VM 150, within a virtual disk drive of the VM 150, or the like.

In accordance with embodiments of the present disclosure, the on-demand code execution system 110 further includes a snapshot management system 160 configured to generate snapshots associated with VMs 150. Specifically, and as will be described in more detail below, the snapshot management system 160 can be configured to generate a snapshot reflecting a state of a VM 150 at a point in time in which the VM 150 is initialized to begin execution of a task, which snapshot is generally referred to herein as a task-specific snapshot. (Note that, as stated above, while the virtual machine instances 150 are described here as being assigned to a particular task, in some embodiments, the instances may be assigned to a group of tasks, such that the instance is tied to the group of tasks and any tasks of the group can be executed within the instance. In such instances, a task-specific snapshot may be more accurately referred to as a task group-specific snapshot.) In some embodiments, task-specific snapshots may be generated based on other snapshots, such as runtime- or OS-specific snapshots. Multiple task-specific snapshots may incorporate state information by reference to one or more common runtime- or OS-specific snapshots, reducing the data required to represent a given task-specific snapshot.

Snapshots generated by the snapshot management system 160 can be stored in a snapshot data store 164 for access by worker managers 140. The snapshot data store 164 may correspond to any persistent or substantially persistent data storage device, including (but not limited to) hard disk drives, solid state disk drives, network attached storage, etc., or any combination thereof.

Each worker manager 140 may be provisioned with snapshots from the snapshot data store 164, such that a virtual machine instance 150 that is pre-initialized for a given task can be quickly generated from a snapshot and placed into the active pool 140A. In one embodiment, task-specific snapshots within the snapshot data store 164 are distributed across worker managers 140 such that all or a large portion of tasks on the on-demand code execution system 110 (which portion may include, for example, tasks that are frequently requested to be execute) are represented by task-specific snapshots stored at a worker manager 140. As such, when a request to execute a task is received, the frontend 120 may route instructions to execute the task to a worker manager 140 associated with a locally stored task-specific snapshot. In one embodiment, task-specific snapshots are distributed among worker managers 140 based on reference to common reference snapshots, such as an OS- or runtime-specific snapshot. Thus, duplication of OS- or runtime-specific snapshots among worker managers 140 can be reduced, reducing the overall storage needs of the on-demand code execution system 110.

Snapshots on a worker manager 140 are illustratively stored within secondary memory 144 of the worker manager 140. Secondary memory 144 can be contrasted to primary memories, such as RAM, supporting execution of VMs 150 within the active pool. In one embodiment, secondary memories 144 correspond to one or more lower tier memories, which are less rapid than primary memory, but which are illustratively greater in capacity. The secondary memories 144 can correspond, for example, to 3D)(POINT, flash memory, magnetic storage, or network-attached storage.

While some functionalities are generally described herein with reference to an individual component of the on-demand code execution system 110, other components or a combination of components may additionally or alternatively implement such functionalities. For example, while the snapshot management system 160 is depicted in FIG. 1 as a distinct device, in some instances, one or more worker managers 140 may implemented functionalities corresponding to the snapshot management system 160. Similarly, while a distinct snapshot data store 164 is shown in FIG. 1, in some embodiments the snapshot data store 164 may be implemented as a logical construct divided across underlying data storage on the worker managers 140 (e.g., the secondary memories 144). Thus, the specific configuration of elements within FIG. 1 is intended to be illustrative.

Figure 2:
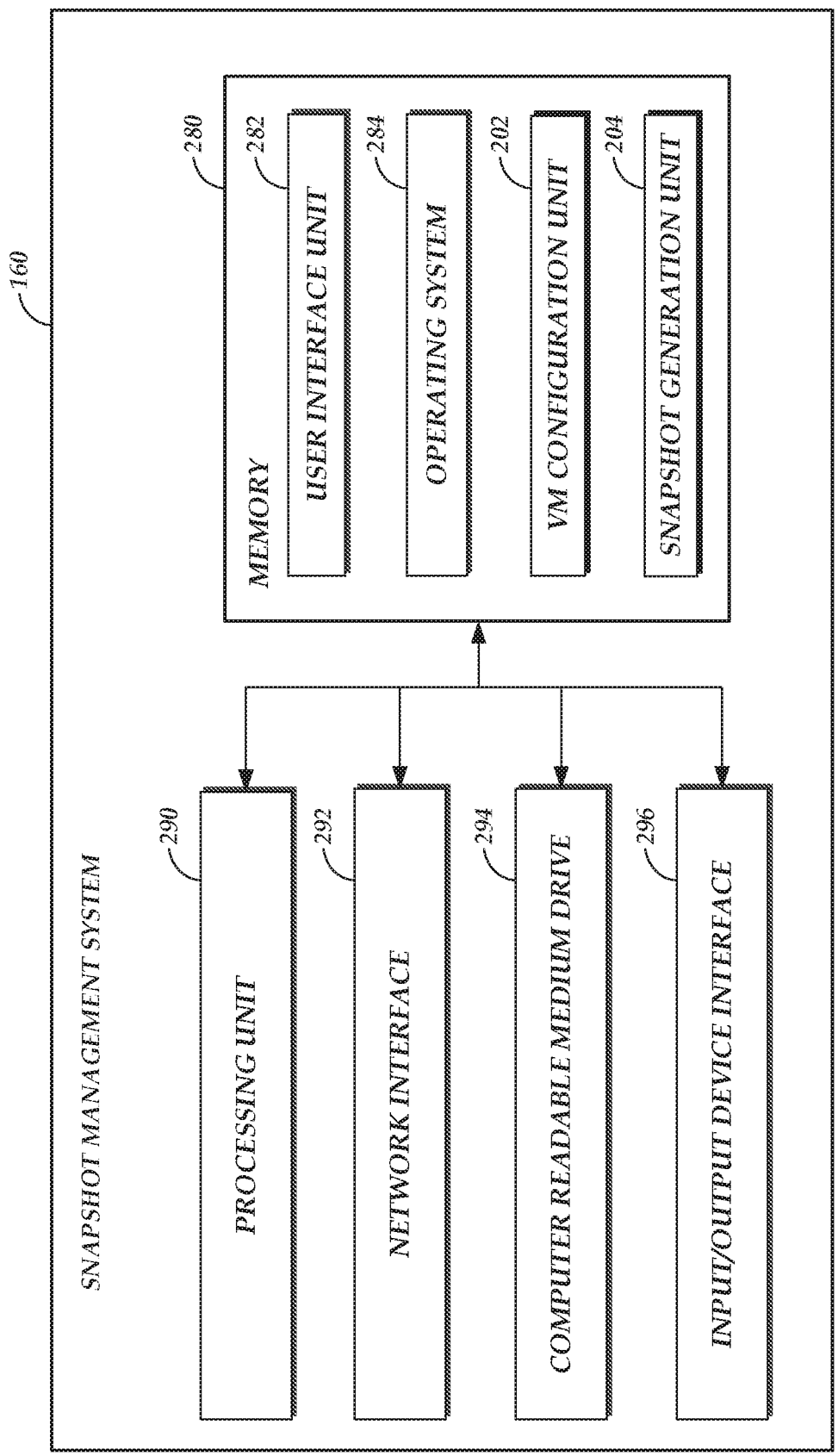
FIG. 2 depicts a general architecture of a computing device providing a snapshot management system that may function to generate snapshots of virtual machine instances initialized to execute the code on the on-demand code execution system of FIG. 1.

FIG. 2 depicts a general architecture of a computing system (referenced as snapshot management system 160) that operates to generate snapshots of pre-initialized virtual machine instances within the on-demand code execution system 110. The general architecture of the snapshot management system 160 depicted in FIG. 2 includes an arrangement of computer hardware and software modules that may be used to implement aspects of the present disclosure. The hardware modules may be implemented with physical electronic devices, as discussed in greater detail below. The snapshot management system 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the snapshot management system 160 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the sidecar configuration system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a virtual machine configuration unit 202 and a snapshot generation unit 204 that may be executed by the processing unit 290. In one embodiment, the virtual machine configuration unit 202 and the snapshot generation unit 204 individually or collectively implement various aspects of the present disclosure, e.g., generating a virtual machine instance provisioned with software enabling execution of a task, initializing the virtual machine instance to a point from which it can begin executing code of the task, creating a snapshot of the state of the instance at that point, etc., as described further below.

While the virtual machine configuration unit 202 and the snapshot generation unit 204 are shown in FIG. 2 as part of the snapshot management system 160, in other embodiments, all or a portion of the virtual machine configuration unit 202 and the sidecar configuration unit 204 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the snapshot management system 160.

In some embodiments, the snapshot management system 160 may further include components other than those illustrated in FIG. 2. For example, the memory 280 may include software enabling the snapshot management unit 160 to operate as a worker manager 140 within the on-demand code execution system 110. Examples of such software are described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Figure 3:
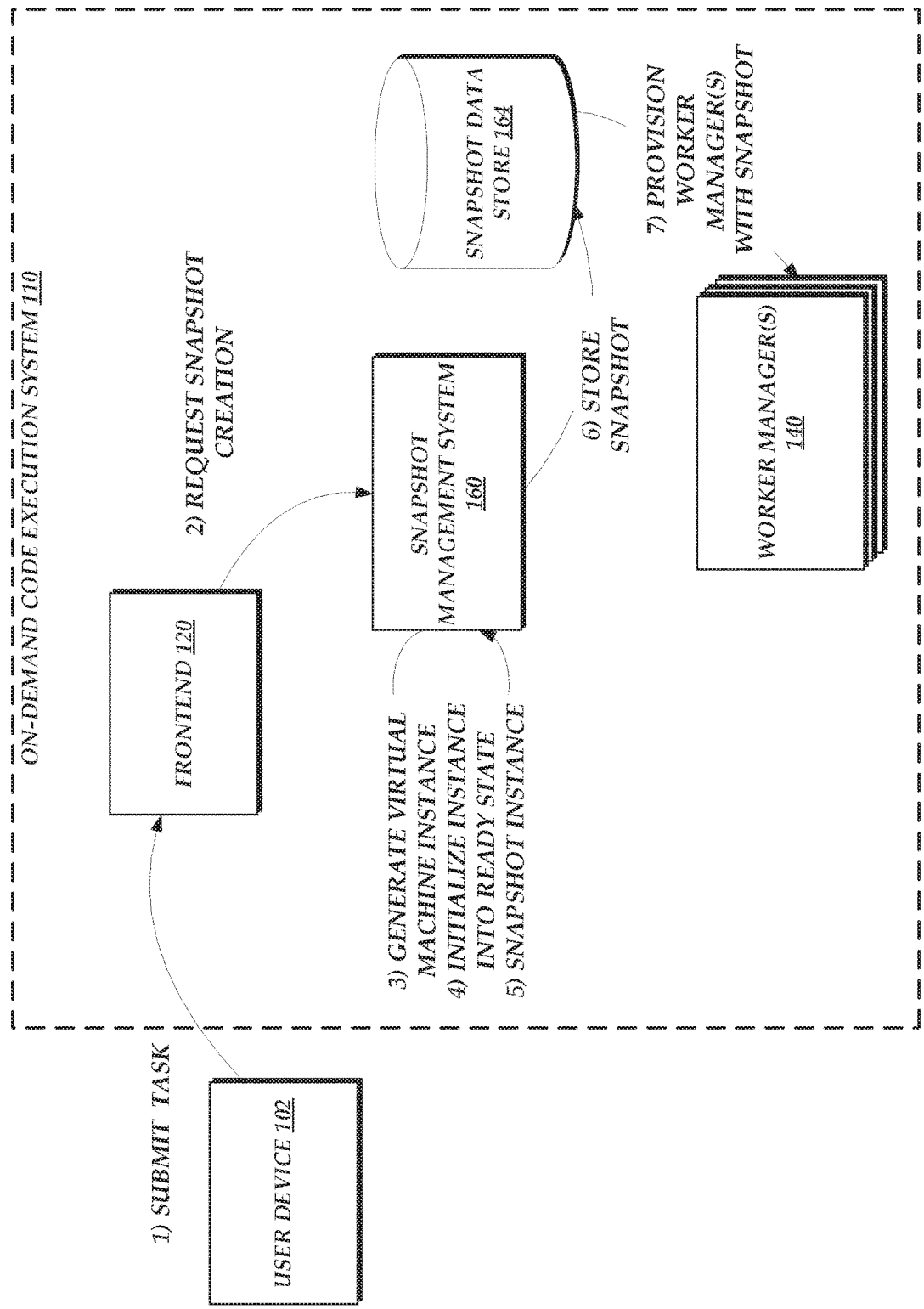
FIG. 3 is a flow diagram depicting illustrative interactions for generating a snapshot of a virtual machine instance on the on-demand code execution system of FIG. 1 at a point in time that the virtual machine instance is initialized to execute user-submitted code.

With reference to FIG. 3, illustrative interactions are depicted for generating state information for a pre-initialized virtual machine instance on the on-demand code execution system 110, which state information may later be used to recreate the pre-initialized virtual machine instance, supporting low latency execution of code.

The interactions of FIG. 3 begin at (1), where a user device 102 submits a task to the frontend 120 of the on-demand code execution system 120. Illustratively, the submission may include source code to be executed on execution of the task, as well as dependency information for the task (e.g., an operating system, runtime, libraries, etc.). Various embodiments for managing dependency information for a task are described within U.S. patent application Ser. No. 15/895,449, entitled "DEPENDENCY HANDLING IN AN ON-DEMAND NETWORK CODE EXECUTION SYSTEM" and filed Feb. 13, 2018 (the "'449 Application"), the entirety of which is incorporated by reference herein.

At (2), the frontend 120 transmits a request to the snapshot management system 160 to generate a snapshot of a pre-initialized virtual machine instance for the task. The snapshot management system 160, in turn, generates the pre-initialized virtual machine instance. Specifically, at (3), the snapshot management generates a virtual machine instance, and at (4), the snapshot management unit initializes the virtual machine instance into a state at which the instance is ready to begin executing the task code.

In one embodiment, generation of a virtual machine instance (e.g., at (3)) can include creation of a wholly new instance. For example, the snapshot management system may create a new virtual machine instance and provision the virtual machine instance with dependency objects of the task, such as by installing an operating system and runtime onto the virtual machine instance. In another embodiment, generation of a virtual machine instance can be based on a snapshot of the state of a pre-existing virtual machine instance that is appropriate for execution of the task. For example, where the task depends on a specific operating system and the snapshot management system 160 has previously created and snapshotted a virtual machine instance having the specific operating system installed, the snapshot management system 160 may generate a virtual machine instance from the snapshot. Use of a preexisting snapshot may both reduce the time to generate a virtual machine instance (e.g., by eliminating the need to install an operating system, etc.), and reduce the size of state information for the later-created snapshot of the pre-initialized virtual machine instance (e.g., since that state information can be saved in the form of a snapshot that references the preexisting snapshot). In some instances, the snapshot management system 160 implements interaction (3) by first determining whether one or more pre-existing snapshots exists that reflects a virtual machine instance provisioned with dependency objects of the present task. If such snapshots do exit, the snapshot management system 160 may select the snapshot that represents a virtual machine instance provisioned with a greatest amount of the dependency objects of the present task. Illustratively, where the dependency objects of a task form a "graph" for the task (e.g., as depicted in FIG. 6 of the '449 Application, the snapshot management system 160 may select the snapshot that represents the most nodes of that graph. The snapshot management system 160 may then generate a virtual machine instance from the selected snapshot. When such a snapshot does not exist, the snapshot management system 160 may instead generate a new virtual machine instance for the task, provisioned with the dependency objects of the task.

In some instances, the snapshot management system 160 may generate one or more snapshots during the generation of a new virtual machine instance, or modification of an instance generated from a pre-existing snapshot. For example, each time a virtual machine instance is provisioned with a new dependency object, the snapshot management system 160 may determine whether a pre-existing snapshot exists that reflects a virtual machine instance provisioned with the new dependency object. If such a pre-existing snapshot does not exist, the snapshot management system 160 may take a snapshot of the virtual machine instance provisioned with a new dependency object. In this manner, a "web" of snapshots may be created which reflects a graph of dependency objects for tasks on the system 110. For example, the snapshot management system 160 may operate to generate snapshots for virtual machine instances provisioned with each dependency object within a dependency object graph, such that later instances can be quickly created based on a most similar snapshot.

Initialization of the instance into a ready state (e.g., at (4)), can generally include any operations required to be completed on the instance prior to servicing an individual request to execute the task. Initialization can thus include provisioning the virtual machine instance with code of the task and any dependency objects, booting an operating system, loading a runtime environment, and the like. In some instances, a portion of code of a task may be required to be executed prior to servicing an individual request to execute the task. For example, code of a task may include a designated "initialization" portion, to be executed prior to passing arguments of a request to the code of the task. Thus, initialization may include executing a portion of the code of the task, such that an execution of that code reaches a point at which arguments from an execution request can be accepted by the execution.

Thereafter, at (6), the snapshot management system 160 stores the snapshot within the snapshot data store 164. The snapshot data store 164 may further include any prior snapshots that acted as a basis for creation of the new snapshot, as well as information identifying dependencies between the new snapshot and any prior snapshots. The snapshot data store 164 may thus serve as a centralized repository for snapshots of pre-initialized virtual machine instances. As such, at (7), one or more worker managers 140 can be provisioned with the snapshots, to enable rapid execution of code within the pre-initialized instances.

While the interactions of FIG. 3 are described with respect to creation of a snapshot for a single, these interactions may be repeated any number of times. Illustratively, the interactions of FIG. 3 may be repeated for each task submitted to the on-demand code execution system 110, such that a snapshot exists that holds the state of a virtual machine instance pre-initialized to execute each respective task. Because multiple snapshots may reference a prior snapshot, such as an OS- or runtime-specific snapshot, the total data required to store such a variety of snapshots on the snapshot data store 164 can be reduced.

Figure 4:
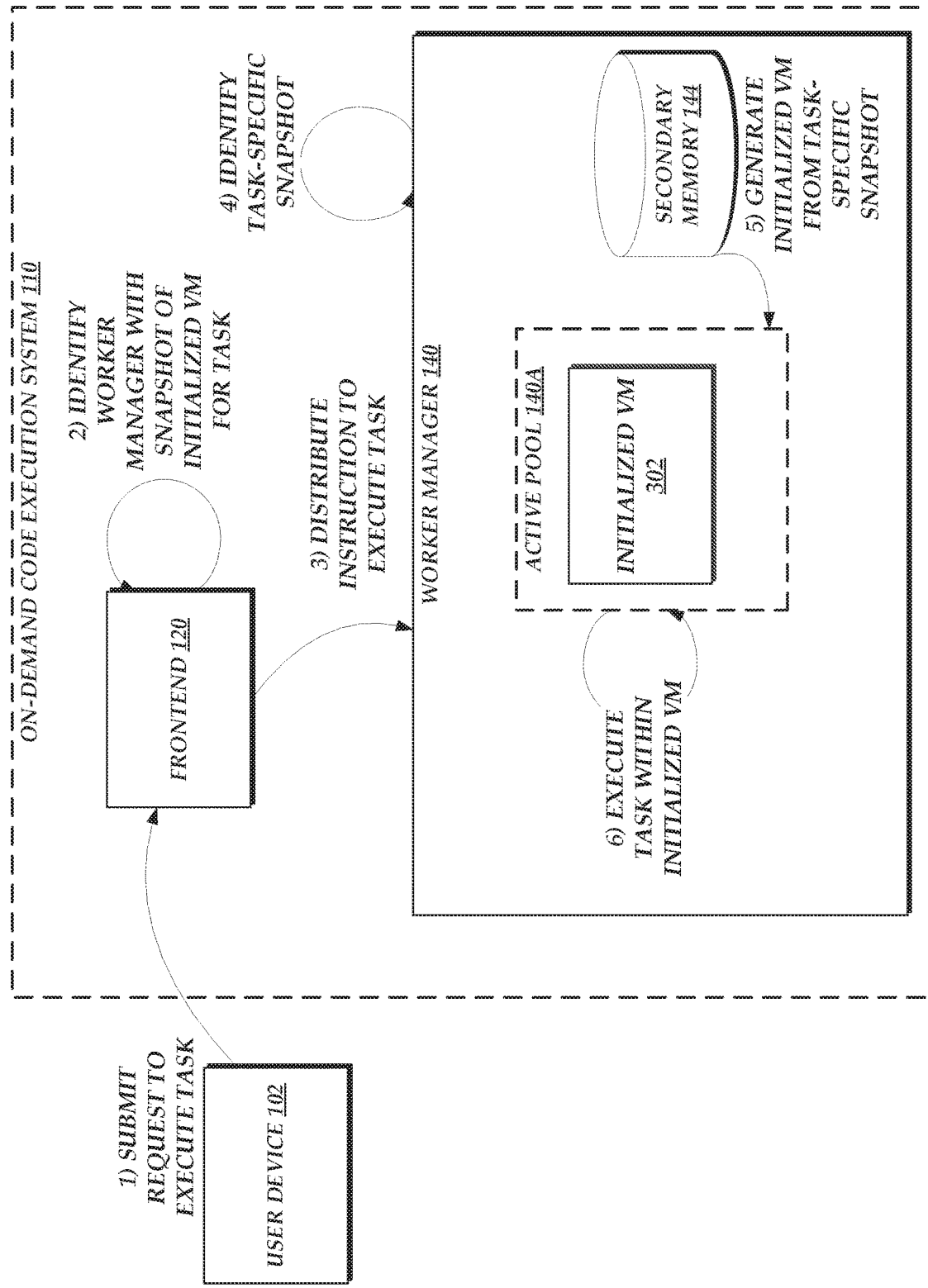
FIG. 4 is a flow diagram depicting illustrative interactions for utilizing a snapshot of a virtual machine instance to support execution of user-submitted code on the on-demand code execution system of FIG. 1.

With reference to FIG. 4, illustrative interactions will be described for utilizing a snapshot of a virtual machine instance in a pre-initialized state to support rapid execution of a task on the on-demand code execution system 110.

The interactions of FIG. 4 begin at (1), where a user device 102 submits to the frontend 120 a request to execute a task on the system 110. The request may correspond, for example, to an API call transmitted by the user device 102. While a request from a user device 102 is illustratively shown in FIG. 4, requests to execute tasks on the system 110 may be received from any number of devices, including auxiliary services 106 or devices within the system 110 (e.g., based on pre-determined trigger conditions).

At (2), the frontend 120 identifies a worker manager 140 that has stored, within secondary memory 144, a snapshot storing the state of a virtual machine instance pre-initialized to execute the task. Illustratively, the frontend 120 may maintain a mapping of worker managers 140 to snapshots stored at each worker manager 140, and may utilize this mapping to identify the worker manager 140. The mapping may be based, for example, on dependencies of the task requested to be executed. As such, if the task depends on a specific runtime, for example, the frontend 120 may identify a worker manager 140 which stores snapshots of tasks that depend on that runtime. While identification of a worker manager 140 associated with a snapshot of a virtual machine pre-initialized for a task is shown in FIG. 4 as a function of the frontend 120, in some instances, worker managers 140 may additionally or alternatively implement this function. For example, a frontend 120 may distribute task execution instructions without regard to identification of a snapshot, and a worker manager 140 may redirect the request to another worker manager 140 if that initial worker manager 140 does not contain an appropriate snapshot for the request.

After identification of a worker manager 140, the frontend at (3) distributes to the worker manager 140 instructions to execute the task. The worker manager 140, in turn at (4), identifies a task-specific snapshot for the task within secondary memory 144. As noted above, the task-specific snapshot can identify state information for a virtual machine instance at a point that the instance is initialized and ready to process a request to execute code of the task. The snapshot may thus reflect the state of a machine after it has booted an operating system, initialized a runtime, executed an initialization portion of user-submitted code, etc.

Thereafter, at (5), the worker manager 140 utilizes the identified task-specific snapshot to generate an initialized virtual machine instance 302 within the active pool 140A. Generation of a virtual machine instance from a snapshot may also be referred to as "restoring" the virtual machine instance whose state is reflected in the snapshot.

The worker manager 140 can then, at (6), execute the task within the initialized VM 302. Execution of the task may include, for example, passing arguments submitted within the request to execute the task to source code of the task, which code is executed to implement functionality corresponding to the task. Because the initialized VM 302 is in a state at which it can begin executing a task, interactions (5) and (6) can occur in rapid succession, without requiring that initialization occur on the VM 302. In one example, the VM 302 need not load an operating system, install or initialize a runtime, allocate memory for task code, or the like. Moreover, because generation of an initialized VM 302 from a task-specific snapshot can require mere milliseconds, a total time to begin execution of the task from a time at which the request is received can be similarly low (e.g., at 50-100 milliseconds or less).

While the interactions of FIG. 4 are depicted with respect to a single request to execute a task, these interactions may be repeated for each request to execute a task on the on-demand code execution system. In this manner, a single task-specific snapshot may facilitate generation of a large number of different virtual machine instances, thus amortizing the costs associated with initializing the virtual machine instance recorded in the snapshot. Illustratively, each virtual machine instance may be associated with a different user on the on-demand code execution system, ensuring privacy of users' data with respect to other users.

Various modifications to the above-discussed interactions are contemplated within the present disclosure. For example, in one embodiment, rather than generating a new virtual machine instance from a snapshot, the worker manager 140 may maintain a virtual machine instance in the active pool 140A (e.g., as executing or non-executing) in a state other than that reflected in a task-specific snapshot, and on receiving instructions to execute a task, utilize the task-specific snapshot to modify the maintained virtual machine instance into the state reflected in that snapshot. Modification of an existing virtual machine instance may beneficially reduce the time to create an instance in the state reflected in the task-specific snapshot. In one embodiment, the executing virtual machine instance may be created based on a less specific snapshot, such as an OS- or runtime-specific snapshot used as a basis for creating a set of task-specific snapshots. Thus, when a worker manager 140 obtains instructions to execute a task, the worker manager 140 may modify the virtual machine instance initialized with an OS or runtime to further initialize the instance to execute the task. Because the task illustratively depends on the OS or runtime, the modifications to state of the virtual machine instance such that it matches the state recorded in the task-specific snapshot may be minimal. As an additional example, where the on-demand code execution system 110 maintains user-specific snapshots for a task (e.g., each recording a state of a virtual machine instance initialized to execute a task and dedicated to executions on behalf of a given user), the active pool 140A may maintain a virtual machine instance in a state recorded in a task-specific snapshot and, on receiving instructions to execute a task on behalf of a given user, modify the maintained instance to match the state recorded in a user-specific snapshot for that user. This process may speed the system 110 in providing a user-specific instance, since the changes between a user-specific snapshot reflecting a user-specific virtual machine instance and the task-specific snapshot initially used to create that user-specific virtual machine instance can be expected to be small.

Figure 5:
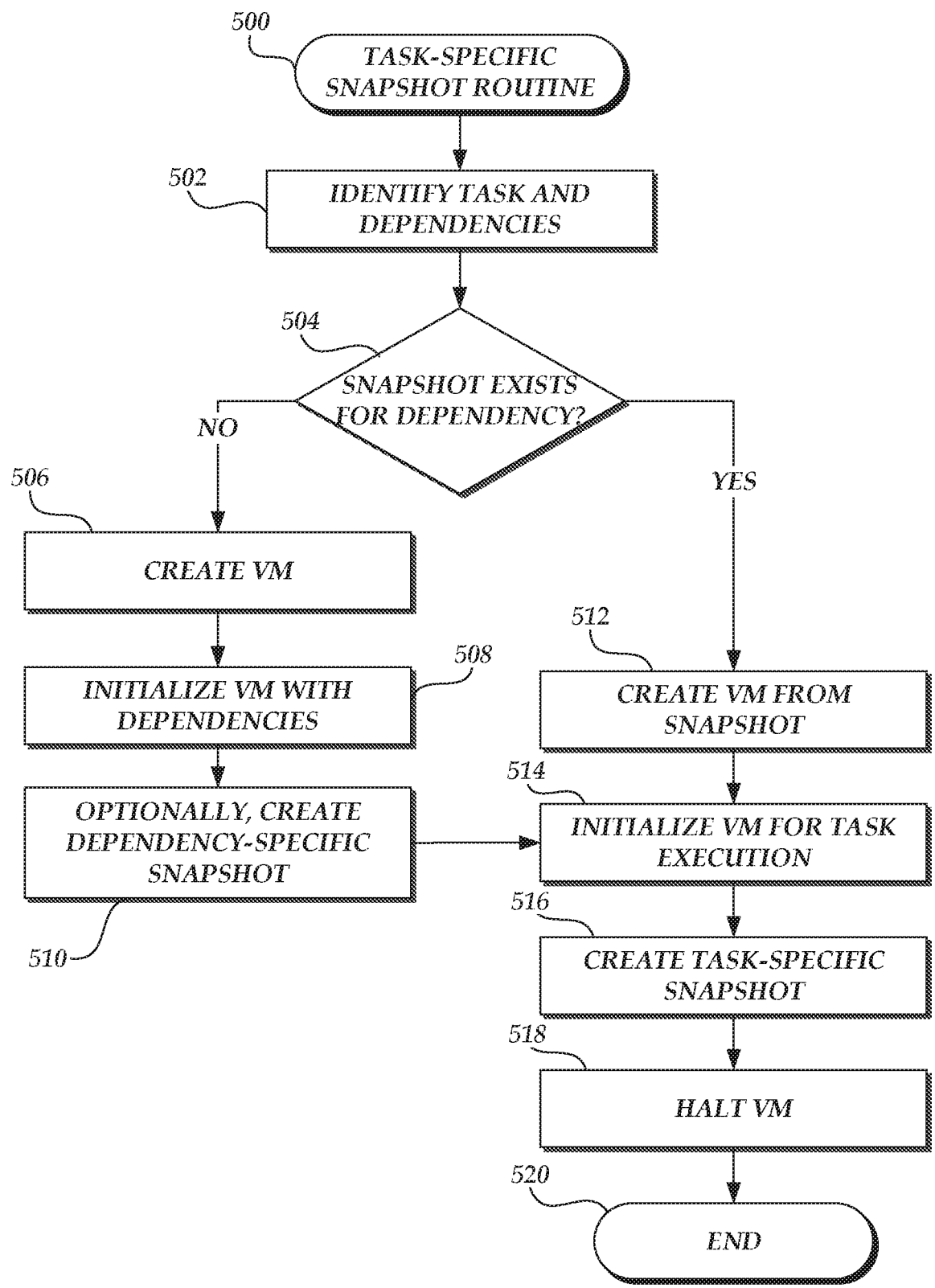
FIG. 5 is a flow chart depicting an illustrative routine for generating task-specific snapshots on the on-demand code execution system of FIG. 1, which snapshots may be used to rapidly execute tasks on the system.

With reference to FIG. 5 one illustrative routine 500 for generating task-specific snapshots on an on-demand code execution system 110 will be described. The routine 500 may be carried out, for example, by the snapshot management system 160 of FIG. 1.

The routine 500 begins at block 502, where the snapshot management system 160 identifies a task for which a task-specific snapshot should be created, as well as dependencies of that task. The task may be identified, for example, subsequent to submission of the task to a frontend 120 of the system 110. Dependencies may be identified based on information submitted in conjunction with a task, such as a specific operating system, runtime, library, etc., on which the code of the task depends.

At block 504, the snapshot management system 160 determines whether a snapshot exists for a dependency of the task. Illustratively, where the task depends on a number of dependency objects represented as nodes within a graph, the snapshot management system 160 may determine whether a snapshot exists recording a state of a machine initialized with at least one such node. Where more than one snapshot exists, the snapshot management system 160 may select the snapshot with a highest number of nodes within that graph. Accordingly, if the task for example depends on a specific operating system, runtime, and library, and a snapshot exists storing a state of a virtual machine instance initialized with that operating system, runtime, and library, the snapshot management system 160 may identify that snapshot at block 504.

In some embodiments, snapshots may be associated with permissions based on those dependency objects initialized in the instance whose state is recorded in the snapshot. For example, if a given snapshot is a task-specific snapshot, the snapshot may inherit permissions of the task. In general, the permissions of a snapshot may be set as the minimum permissions associated with each dependency object initialized in the instance whose state is recorded in the snapshot. Implementation of block 504 may thus further include selecting a snapshot to which an owner of a current task has permission to access. Such an implementation may prevent, for example, a task-specific snapshot associated with a task of a first user from being selected as a basis for creating a task-specific snapshot associated with a task of a second user. In other instances, such scenarios may be prevented by selecting, at block 504, snapshots initialized only with dependency objects of a current task. In such an implementation, a snapshot reflecting an instance initialized with three dependency objects would not serve as a basis for a task depending on only two of those three dependencies, for example.

If a snapshot exists for a dependency of the task, the routine 500 proceeds to block 512, where a virtual machine instance is generated based on that snapshot. Alternatively, if such a snapshot does not exist, the routine 500 proceeds to block 506, were a virtual machine instances is created without use of such a snapshot (e.g., as a new virtual machine instance). At block 508, that virtual machine instance is initialized with dependencies of the task, such as an operating system, runtimes, etc. Illustratively, initialization may include installing each dependency, and bringing the instance to a state at which each dependency is running and ready to support execution of other code. Optionally, at block 510, a snapshot may be taken of the virtual machine instance initialized with the dependencies. This snapshot may form the basis for later creation of task-specific snapshots. In some instances, blocks 508 and 510 may be implemented iteratively, such that after initialization of each dependency object, a new snapshot is created. In this manner, a variety of snapshots can be generated reflecting different combinations of dependency objects.

In either instance, the routine 500 the proceeds to block 514, where the virtual machine instance is initialized to execute the task. Initialization may include, for example, loading code of the task into the instance and readying dependency objects, such as runtimes, to execute that code. In some instances, initialization may include executing a portion of the code, such as an initialization portion.

Once the instance is initialized into a ready state to support a request for execution of the task code, a task-specific snapshot of the instance is generated at block 516. As noted above, generation of a snapshot can include recording a full state of the instance, including values such as CPU registers, RAM contents, disk contents, and the like. As discussed above, the snapshot can later be used to generate a new virtual machine, or modify an existing virtual machine, such that it's state matches that of the instance reflected in the snapshot. Because that instance is initialized to support execution of a task, the instance is not required to undergo initialization in response to a request to execute the task. As such, the instance can support rapid execution of a task.

Thereafter, at block 518, the instance is halted, thus freeing resources of the system 110 to support other instances executing other tasks. In this manner, a pre-initialized virtual machine instance can be maintained at the system 110 for a task, without consuming resources of the system 100 to maintain that instance in a running state. When a request to execute a task is received, that task can be quickly executed by restoring the instance from the snapshot, as described above. The instance can then be moved once again to a non-executing state, by creating and storing a snapshot of the image. Because the data required to store each snapshot is expected to be relatively small (e.g., reflecting only a difference from a more general OS- or runtime-specific snapshot), the system 110 can be configured to effectively maintain instances specific to all or nearly all tasks on the system 110, without being required to continuously execute those instances. As noted above, the task-specific snapshot may then be used to rapidly recreate numerous environments in which to execute the task, without requiring repetition of initialization phases for the environments.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method to execute code on an on-demand code execution system by utilization of a snapshot of a virtual machine instances pre-initialized to support execution of the code, the computer-implemented method comprising:
    obtaining code submitted by a user for execution on an on-demand code execution system, wherein execution of the code depends on an operating system and a runtime;
    generating a first virtual machine instance provisioned with the operating system and runtime;
    initializing the operating system and runtime on the first virtual machine instance into a ready state for execution of the code, wherein initializing the operating system and runtime on the first virtual machine instance into the ready state for execution of the code comprises initializing the runtime on the operating system;
    generating a snapshot of the first virtual machine instance at a time that the operating system and runtime on the first virtual machine instance are initialized into the ready state for execution of the code;
    storing the snapshot as an execution-ready snapshot for the code;
    obtaining a request to execute the code, the request corresponding to the user of the on-demand code execution system; and
    in response to the request to execute the code:
        generating, from the execution-ready snapshot for the code that reflects the snapshot of the first virtual machine instance at a time that the operating system and runtime on the first virtual machine instance are initialized into the ready state for execution of the code, a second virtual machine instance including the initialized operating system and runtime, the second virtual machine instances corresponding to the user; and
        executing the code within the second virtual machine instance corresponding to the user.

2. The computer-implemented method of claim 1, wherein the runtime is at least one of an interpreter or a compiler for the code.

3. The computer-implemented method of claim 1 further comprising halting execution of the first virtual machine instance after generating the snapshot, wherein generating the second virtual machine instance from the an execution-ready snapshot for the code comprises generating a new virtual machine instance and updating the new virtual machine instance, using the an execution-ready snapshot for the code, to match the ready state.

4. The computer-implemented method of claim 1, wherein generating the second virtual machine instance from the an execution-ready snapshot for the code comprises modifying an executing virtual machine instance, using the an execution-ready snapshot for the code, to match the ready state.

5. The computer-implemented method of claim 1, wherein generating the first virtual machine instance provisioned with the operating system and runtime comprises:
    obtaining a snapshot of a third virtual machine instance provisioned with the operating system;
    generating, from the snapshot of the third virtual machine instance, the first virtual machine instance, wherein the first virtual machine instance includes the operating system; and
    adding the runtime to the first virtual machine instance provisioned with the operating system.

6. The computer-implemented method of claim 5, wherein the snapshot of the third virtual machine instance records a state of the third virtual machine instance provisioned with the operating system when the operating system is in an initialized state.

7. Non-transitory computer-readable media comprising instructions that, when executed by a computing system, cause the computing system to:
    generate a first virtual machine instance provisioned with (i) code submitted by a user for execution on an on-demand code execution system and (ii) an operating system and a runtime on which execution of the code depends;
    initialize the operating system and runtime on the first virtual machine instance into a ready state for execution of the code, wherein initializing the operating system and runtime on the first virtual machine instance into the ready state for execution of the code comprises initializing the runtime on the operating system;
    generate a snapshot of the first virtual machine instance at a time that the operating system and runtime on the first virtual machine instance are initialized into the ready state for execution of the code;
    store the snapshot as an execution-ready snapshot for the code;
    obtain a request to execute the code, the request corresponding to the user of the on-demand code execution system; and
    in response to the request to execute the code:
        generate, from the execution-ready snapshot for the code that reflects the snapshot of the first virtual machine instance at a time that the operating system and runtime on the first virtual machine instance are initialized into the ready state for execution of the code, a second virtual machine instance in the ready state for execution of the code, including the initialized operating system and runtime; and
        execute the code within the second virtual machine instance.

8. The non-transitory computer-readable media of claim 7, wherein the instructions cause the computing system to generate the first virtual machine instance at least partly by:
   identifying one or more dependencies on which execution of the code depends;
   selecting a second snapshot, the second snapshot storing a state of a virtual machine instance initialized with the one or more dependencies; and
   generating the first virtual machine instance based on the second snapshot.

9. The non-transitory computer-readable media of claim 8,
   wherein the second snapshot is selected from a plurality of snapshots based at least in part on a number, of the one or more dependencies on which execution of the code depends, that are initialized on the virtual machine instance whose state is captured within the second snapshot.

10. The non-transitory computer-readable media of claim 7,
    wherein the instructions cause the computing system to initialize the operating system and runtime on the first virtual machine instance into the ready state for execution of the code based at least partly on executing an initialization portion of the code.

11. The non-transitory computer-readable media of claim 10, wherein the request to execute the code comprises parameters to be passed to an execution of the code, and wherein executing an initialization portion of the code places the execution of the code in a state corresponding to a location, within the code, at which the parameters are processed by the execution.

12. The non-transitory computer-readable media of claim 7, wherein the instructions cause the computing system to generate the second virtual machine instance from the execution-ready snapshot for the code at least partly by at least one of generating a new virtual machine instance and updating the new virtual machine instance to match the ready state or modifying an executing virtual machine instance to match the ready state.

13. A system comprising:
    a data store including an execution-ready snapshot for code submitted by a user for execution on an on-demand code execution system, wherein execution of the code depends on an operating system and a runtime, and wherein the an execution-ready snapshot for the code records a state of a first virtual machine instance provisioned with the code and initialized into a ready state for executing the code, the ready state including the operating system being initialized and the runtime being initialized on the operating system;
    one or more computing devices configured with specific executable instructions to:
      obtain a request to execute the code, the request corresponding to the user of the on-demand code execution system; and
      in response to the request to execute the code:
        generate, from the execution-ready snapshot for the code that reflects the snapshot of the first virtual machine instance at a time that the operating system and runtime on the first virtual machine instance are initialized into the ready state for execution of the code, a second virtual machine instance including the initialized operating system and runtime; and
        execute the code within the second virtual machine instance corresponding to the user.

14. The system of claim 13, wherein the one or more computing devices are further configured to generate the execution-ready snapshot for code, and wherein to generate the execution-ready snapshot for the code, the one or more computing devices are configured with specific executable instructions to:
    identify one or more dependencies on which execution of the code depends;
    select a second snapshot, the second snapshot storing a state of a virtual machine instance initialized with the one or more dependencies;
    generate the first virtual machine instance based on the second snapshot; and
    generate the execution-ready snapshot for the code from a snapshot taken of the first virtual machine instance.

15. The system of claim 14, wherein the second snapshot is selected from a plurality of snapshots based at least in part on a number, of the one or more dependencies on which execution of the code depends, that are initialized on the virtual machine instance whose state is captured within the second snapshot.

16. The system of claim 14, wherein the one or more computing devices are further configured to initialize the operating system on the first virtual machine instance into the ready state for execution of the code at least partly by executing an initialization portion of the code.

17. The system of claim 16, wherein the request to execute the code comprises parameters to be passed to an execution of the code, and wherein executing an initialization portion of the code places the execution of the code in a state corresponding to a location, within the code, at which the parameters are processed by the execution.

18. The system of claim 13, wherein to generate the second virtual machine instance from the execution-ready snapshot for the code, the one or more computing devices are further configured with specific executable instructions to at least one of: modify an executing virtual machine instance to match the ready state or generate a new virtual machine instance and update the new virtual machine instance to match the ready state.

19. The system of claim 13, wherein the virtual machine instance is generated at least partly by:
    prior to obtaining the request from the user, generating in a primary memory of a host device the second virtual machine instance; and
    after obtaining the request, modifying second the virtual machine instance to match a state recorded within a user-specific snapshot, the state within the user-specific snapshot corresponding to a modification of the ready state after execution of the code on behalf of the user.

* * * * *

UNITED STATES PATENT AND TRADEMARK OFFICE
CERTIFICATE OF CORRECTION

PATENT NO. : 11,099,870 B1  
APPLICATION NO. : 16/045593  
DATED : August 24, 2021  
INVENTOR(S) : Brooker et al.

Page 1 of 1

It is certified that error appears in the above-identified patent and that said Letters Patent is hereby corrected as shown below:

On the Title Page

On page 4, in Column 2, item (56), U.S. Patent Documents, Line 38, delete "Wnterfeldt" and insert --Winterfeldt--.

In the Specification

In Column 17, Line 49, delete "3D)(POINT," and insert --3D XPOINT,--.

In Column 20, Line 13, delete "(e.g.," and insert --e.g.,--.

In the Claims

In Column 26, Line 7, Claim 3, delete "the an" and insert --the--.

In Column 26, Line 10, Claim 3, delete "the an" and insert --the--.

In Column 26, Line 14, Claim 4, delete "the an" and insert --the--.

In Column 26, Lines 15-16, Claim 4, delete "the an" and insert --the--.

In Column 27, Line 46 (approx.), Claim 13, delete "the an" and insert --the--.

In Column 28, Line 8 (approx.), Claim 13, delete "instance corresponding to the user." and insert --instance.--.

In Column 28, Line 54, Claim 19, delete "second the" and insert --the second--.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*